Figure 1:
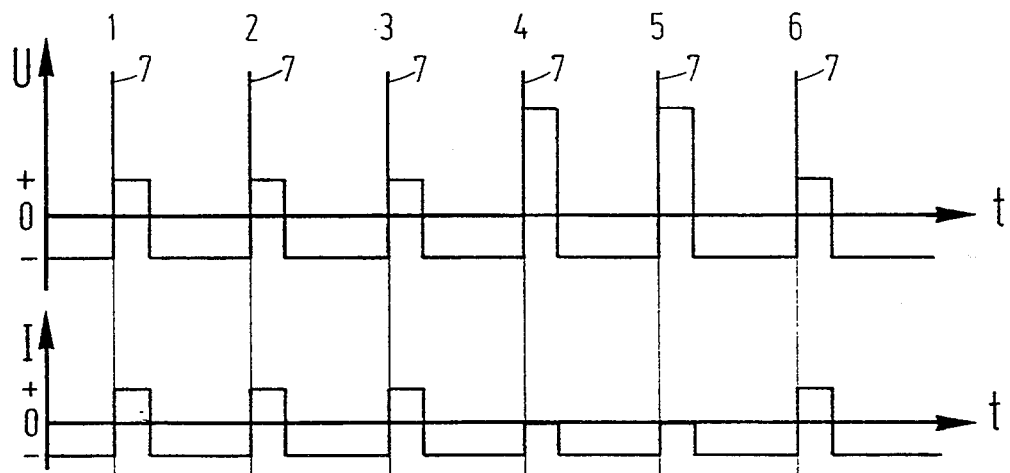

United States Patent [19]
Poulsen et al.

[11] Patent Number: 5,365,035
[45] Date of Patent: Nov. 15, 1994

[54] METHOD AND APPARATUS FOR TIG WELDING

[75] Inventors: Knud J. Poulsen, Aalborg; Werner Scheele, Fjerritslev; Henning Jørgensen, Thisted, all of Denmark

[73] Assignee: Svejsemaskinefabrikken Migatronic A/S, Fjerritslev, Denmark

[21] Appl. No.: 108,998

[22] Filed: Aug. 18, 1993

[30] Foreign Application Priority Data

Aug. 28, 1992 [DK] Denmark ............... 1073/92

[51] Int. Cl.$^5$ ............................................. B23K 9/073
[52] U.S. Cl. ........................ 219/137 PS; 219/130.21; 219/130.4
[58] Field of Search ............ 219/130.51, 130.31, 219/130.32, 130.33, 137 PS, 130.21, 130.4

[56] References Cited

U.S. PATENT DOCUMENTS

| | | |
|---|---|---|
| 3,895,212 | 7/1975 | Maxwell et al. ............... 219/130.21 |
| 4,092,517 | 5/1978 | Woodacre ....................... 219/137 PS |
| 4,947,021 | 8/1990 | Stava . | |
| 4,963,715 | 10/1990 | Tuttle . | |

FOREIGN PATENT DOCUMENTS 2658724 6/1978 Germany ................. 219/130.32

*Primary Examiner*—Clifford C. Shaw
*Attorney, Agent, or Firm*—Merchant & Gould, Smith, Edell, Welter & Schmidt

[57] ABSTRACT

A method of TIG welding with alternating current with a welding apparatus (10) which is arranged in such a manner that the polarity of the welding current is controlled by an electronic control circuit (20), which is also arranged so that it continuously registers whether or not the arc is lit, and in that the welding apparatus comprises a controllable inverter (16) and means for re-igniting the arc in the positive period, and arranged so that the length of the positive period is shortened if the arc is not re-ignited in the positive period. The invention also relates to a welding apparatus which can be equipped with a logical circuit or a programmable circuit which instantly ensures that the positive welding period is shortened if the arc is not re-ignited in this period.

6 Claims, 4 Drawing Sheets tpos = 1/f*(100−B)/100
tneg = 1/f*B/100
f = Frequency (Hz)
B = Balance (%)

METHOD AND APPARATUS FOR TIG WELDING

BACKGROUND OF THE INVENTION

The invention relates to a method for TIG welding.

TIG arc welding with alternating current is used to a great extent for the welding of metals such as aluminium and aluminium alloys. The polarity of current and voltage changes traditionally with 50 or 60 Hz synchronously with the frequency of the power supply to which the welding equipment is connected. Today, wide use is made of inverter-based current sources, and such a welding current source is a prerequisite for the present invention, in that it is hereby possible to adjust the welding machine for frequencies other than those mentioned of the alternating current which is used to transfer the energy to the welding arc.

In the welding process, use is made of the positive half cycle, i.e. when the welding electrode voltage is positive in relation to the workpiece, for cleaning the workpiece by removing the aluminium-oxide layer on the surface of the workpiece, and the negative half cycle is used to heat the workpiece so that a "weldpool" is formed. During the positive half cycle, approx. $\frac{1}{3}$ of the power is dissipated in the workpiece and approx. $\frac{2}{3}$ of the power is dissipated in the tunsten electrode. During the negative half cycle, approx. $\frac{2}{3}$ of the power is dissipated in the workpiece and approx. $\frac{1}{3}$ of the power is dissipated in the tungsten electrode.

When the polarity is changed, the arc must be re-ignited. This occurs easily when the change is from positive to negative polarity, in that the electrode is hot and easily emits electrons, whereas it is difficult to change from the negative polarity to positive polarity. This is partly due to the fact that the electrode is hotter than the weldpool, but also because pure aluminium does not easily emit electrons. The energy required for the emission of electrons from aluminium is very high, and since aluminium oxide is electrically insulating, such a current source must necessarily be equipped with a circuit which imparts a brief pulse with high voltage to the welding circuit in order to re-establish the positive half cycle. Moreover, it is necessary to emit electrons from the aluminium oxide which is constantly formed on the aluminium surface of the weldpool. This means that the positive half cycle can be established only if there are aluminium oxides within a certain radius from the tungsten electrode which is used to transfer the current to the workpiece. It is also necessary for the weldpool to be completely cleansed of aluminium oxide in order to achieve a satisfactory weld quality. In order to be able to adjust the cleansing effect so that it is appropriate for the relevant welding task, many welding current sources are equipped with a regulating element whereby it is possible to adjust the relationship between the time for which the polarity of the tungsten electrode is positive and the time for which the polarity is negative. Such a regulator element enables the cleansing effect to be regulated.

A welding apparatus which uses the known technique explained above is known from U.S. Pat. No. 4,947,021.

From U.S. Pat. No. 4,963,715 there is known another welding apparatus for TIG welding which is provided with a circuit which can detect whether or not the arc is re-ignited in the positive cycle. If the arc is not re-ignited, the ignition voltage is immediately increased to ensure that the arc is re-established.

ADVANTAGES OF THE INVENTION

When using the method as disclosed a more stable arc and herewith a better quality of weld can be achieved than with the known welding processes. The object of the invention is therefore to present a welding method and welding apparatus with which it is possible to achieve optimum welding quality, which is of very great practical significance.

It has proved namely that although the welding apparatus is adjusted for a reasonable amount of cleansing, it can happen that during the welding process the need for cleaning is reduced because the surface is not as oxidized as expected. This can happen for example if welding is carried out at a place where welding has taken place earlier, or if the electrode is held stationary or moved very slowly. The result of this is normally that the positive half period is not re-established every time, and the supply of energy to the weldpool becomes unstable.

Consequently, it is a prerequisite for the invention that the welding current source is arranged in such a manner that the polarity of the welding current is controlled from a control unit by means of one or more signals, so that it is possible to regulate the frequency of the AC balance, i.e. the relationship between the time for which the polarity of the tungten electrode is positive and the time for which it is negative.

According to the invention it is consequently registered whether or not the arc is ignited in the positive period. If ignition takes place, the welding is effected in a quite normal manner and the control circuit according to the invention will thus not be operative. On the other hand, if there is no ignition during the positive period, the period is shortened in that an immediate shift to the negative polarity takes place. The principle is thus that if an arc can not be established during the positive period, this is because there is no need for cleaning and thus there is no reason to wait before changing to negative polarity.

Consequently, the stabilizing effect and the herewith increased welding quality is achieved by ensuring a more constant supply of energy to the arc than is the case with the known welding processes.

Disclosed are advantageous methods of TIG welding with which the improved arc stability and optimum welding quality can be achieved.

The invention also relates to a TIG welding machine as disclosed. Disclosed are two possibilities of configuration for a welding machine, i.e. a hardware solution and a software solution, whereby an inverter-based welding machine can be arranged in order to be able to exercise the method according to the invention.

Disclosed advantageous embodiments for the welding machine's electronic control circuit.

The drawing

Figure 2:
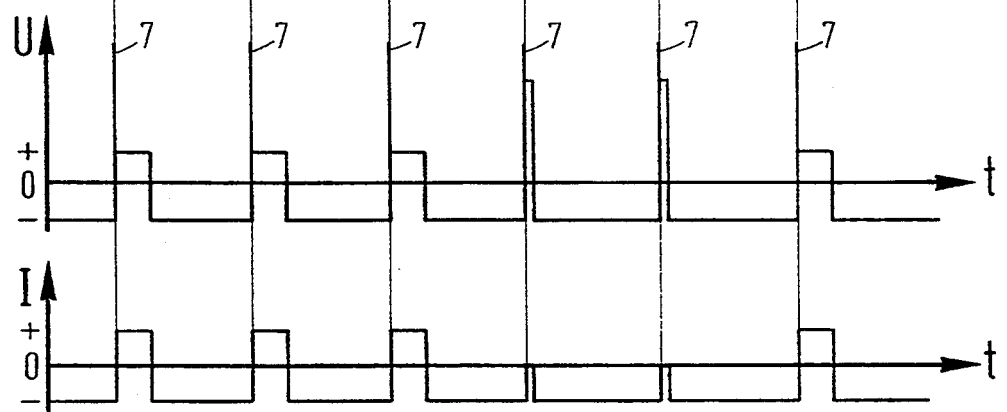
Figure 3:
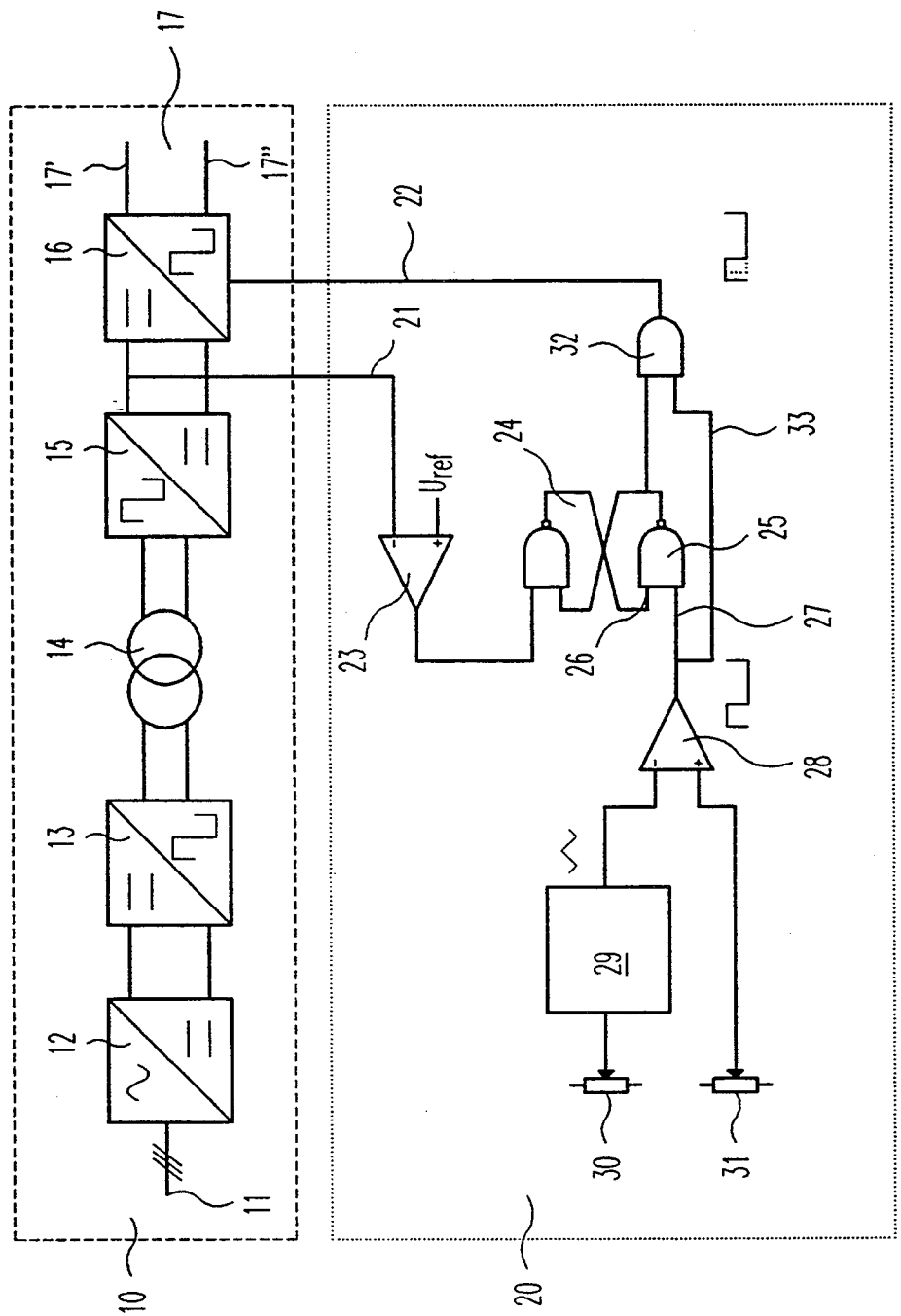
Figure 4:
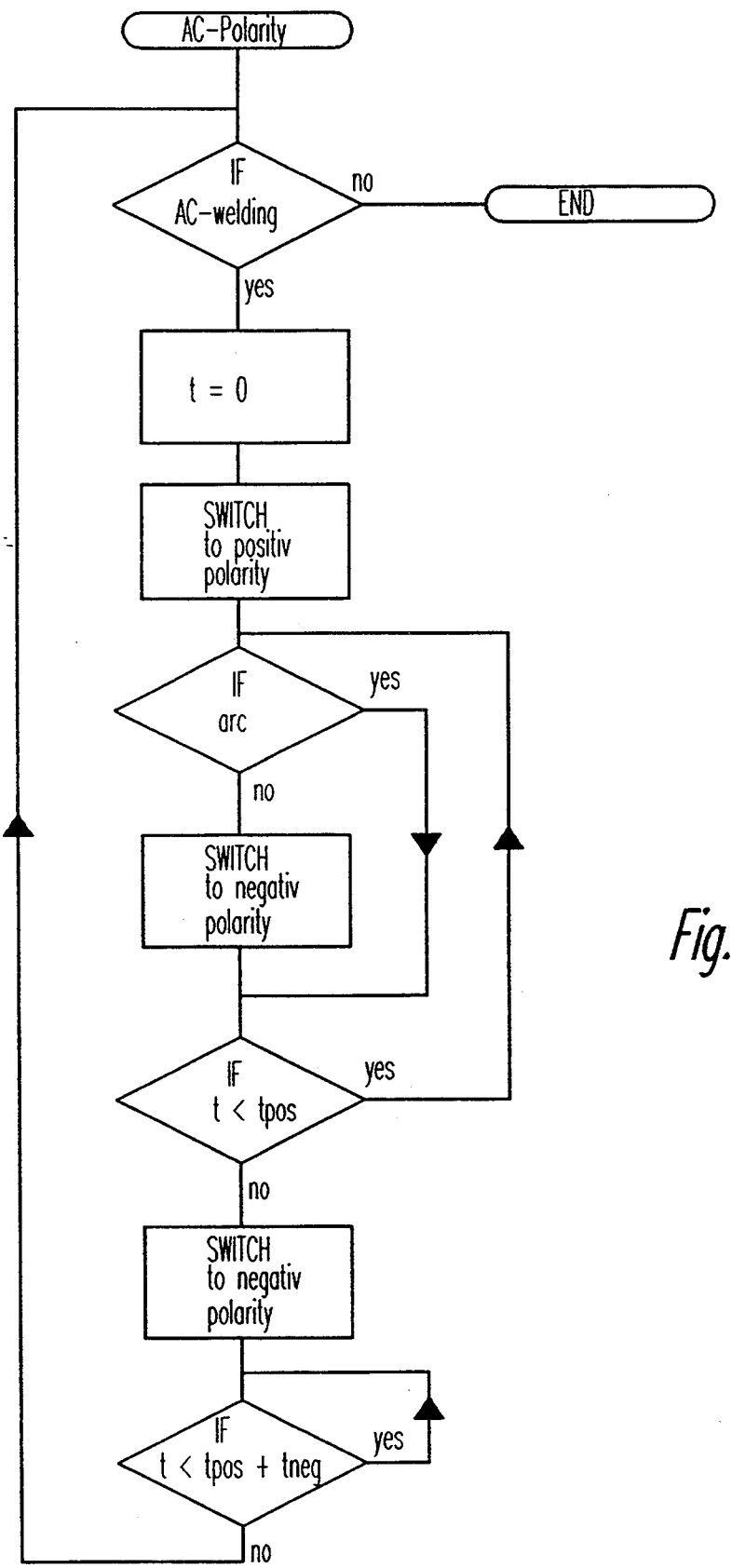
Figure 5:
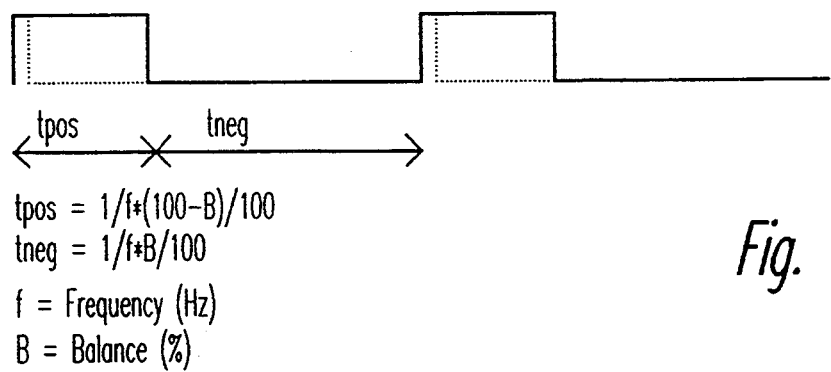

The invention will now be described in more detail with reference to the drawing, in that FIG. 1 shows welding voltage and welding current as a function of the time for a known source of welding current, FIG. 2 shows welding voltage and welding current as a function of the time according to the invention, FIG. 3 shows a preferred configuration for the hardware solution according to the invention, FIG. 4 shows a preferred configuration for the software solution according to the invention, and FIG. 5 shows a pulse diagram for the welding current.

DESCRIPTION OF THE EXAMPLE EMBODIMENTS

The method according to the invention will now be described in more detail with reference to FIGS. 1 and 2 of the drawing. Uppermost in FIG. 1 is shown the welding voltage as a function of the time, and lowermost the welding current as a function of the time, and as they appear in a known welding machine without use of the method according to the invention. The figure shows six voltage periods numbered 1–6 with corresponding current periods. In order to achieve ignition in the positive periods, each period starts with an ignition voltage pulse 7 which is higher than both the welding voltage and the no-load voltage of the welding current source. Such means for the re-ignition of the arc in the positive periods are known, and therefore they will not be dealt with in more detail. It will be seen in the first three periods that correct re-ignition occurs both in the positive part and in the negative part of each period. The welding voltage and welding current are therefore completely normal and as desired.

In the 4th and 5th period no re-ignition occurs in the positive period, and the welding current is therefore 0 during the whole of the positive period and the welding machine stands with full no-load voltage. This results in a reduced supply of power to the arc and therewith the weldpool, and thus in a reduction of arc stability.

In the 6th period, correct re-ignition is achieved in the positive period and the welding process is again quite normal.

FIG. 2 shows welding voltage and welding current as a function of the time when use is made of the method according to the invention, e.g. during the use of one of the welding current sources described later. FIG. 2 shows the same six periods as in FIG. 1, and it will be seen that no re-ignition occurs in the positive parts of the 4th and 5th periods, and for this reason the positive period is shortened so that the time for which the current is 0 is shortened.

If it is ensured that the length of the positive period is shortened immediately that it is ascertained that the arc has not been re-established, it can be seen directly from FIG. 2 that a very uniform supply of power to the arc is achieved.

Consequently, with the method according to the invention, a significant improvement can be achieved in the stability of the arc.

It will be an advantage for arc stability that the length of the negative period is held substantially constant when the positive period is shortened, and that the frequency of the welding current is also held substantially constant when the positive period is shortened.

From the current curve in FIG. 2 it will be seen that in periods where no re-ignition of the arc takes place in the positive part of the period, there can occur a minor change in the supply of energy to the arc in relation to the energy which is supplied under normal welding conditions, i.e. when a normal re-ignition takes place, which is why it can be of advantage to correct the strength of the welding current so that the power which is supplied is held substantially constant, in that this gives the maximum arc stability.

In practice it has proved possible to achieve the desired effect with the method according to the invention with different welding machine embodiments. In the following will be described two embodiments, i.e. a hardware solution as shown in FIG. 3 and a software solution as shown in FIGS. 4 and 5.

In FIG. 3 the reference number 10 indicates an inverter-based welding machine of a known type which functions in accordance with the method which was described in connection with FIG. 1. The welding machine or the welding current source 10 receives normal 3-phased alternating current 11 from a mains supply, and the power is fed to an AC/DC converter 12, normally a 3-phase rectifier. From here, the DC output power is fed to a DC/AC converter 13, the output voltage of which is shown as square-wave pulses, e.g. with a frequency in the order of 50 kHz. The output power is fed to a transformer 14 and further to an AC/DC converter 15. In this manner, a desired DC voltage level is achieved by using a transformer 14 of minimum size, and thus the usually very large and heavy welding transformers are avoided.

The DC power is then fed to a DC/AC converter 16 which is configured as a controllable inverter coupling, the output frequency of which can be regulated, e.g. from 5 Hz to 500 Hz.

The electronic control circuits and measuring circuits in the converters are normally arranged in such a way that the strength of the current and the frequency are constantly monitored, and thus the circuits can instantly register if there is no flow of welding current in the welding circuit 17 between the output 17' and 17'', where for example the output 17' is the tungsten electrode in the TIG welding arrangement and 17'' is the electrical conductor which leads to the workpiece. In addition, the welding current source is normally provided with means of regulation, whereby it is possible to adjust the relationship between the time for which the polarity of the tungsten electrode is positive and the time for which the polarity is negative, so that the welding machine operator himself can adjust the cleaning effect.

For the execution of the method according to the invention, a circuit 20 is added which, via the lead 21, senses whether or not a re-ignition has occurred in the positive period. If a re-ignition has occurred, the control circuit 20 does not have any influence on the welding process. On the other hand, if re-ignition has not occurred, the control circuit 20 will react and will transmit a signal via the lead 22. This signal will instantly ensure that the welding voltage changes from positive to negative potential, cf. the explanation in connection with FIG. 2.

The control circuit 20 comprises an oscillator 29 with frequency adjustment elements 30, so that an adjustable sawtooth voltage is fed to the comparator 28, to which there is also fed a balance signal from a balance regulation element 31. There is hereby generated the control voltage which ensures the welding voltage changes in the controllable inverter 16. The output signal from the comparator 28 is fed to a logical circuit 25, which forms part of a latch coupling 24, and also to a logical circuit 32.

The lead 21 is connected via a comparator 23 to the other input of the latch coupling 24. For level adjustment, the comparator 23 is coupled to a reference voltage which can be adjustable.

The control circuit 20 functions as follows: When a signal is received at the latch coupling 24 via the lead 21 and the comparator 23, this indicates that no reignition has occurred in the positive period, and the logical circuit 32 immediately switches over so that a changeover of the welding voltage takes place via the lead 22. If there is no signal from the comparator 23, the latch coupling 24 is not triggered and the control signal from the comparator 28 passes via the lead 33 directly to the logical circuit 32. Consequently, there is no changeover of the welding voltage from positive to negative polarity until the welding current sequence has been as long as determined by the adjusting elements 30, 31.

In FIGS. 4 and 5 is shown a logical function diagram for a software solution. Instead of the control circuit 20, a programmable microprocessor is inserted in the welding machine 10, which is suitably programmed in an appropriate programming language so that the logical function diagram in FIG. 4 is followed.

FIG. 5 shows chronologically the changeover of the welding voltage, in that $t_{pos}$ indicates the period of time for which the voltage is positive and $t_{neg}$ indicates the period of time for which the voltage is negative.

$$t_{pos} = \frac{1}{f} \cdot \frac{(100-B)}{100}$$
$$t_{neg} = \frac{1}{f} \cdot \frac{B}{100}$$

where f=frequency [Hz] and B=balance [%]

The electronic switch in the inverter coupling 16 is hereby changed over by means of the microprocesor following the same function as explained in connection with FIGS. 2 and 3 of the drawing.

The fully-drawn line in FIG. 5 shows the chronological sequence of the welding voltage when the welding takes place in a normal manner, i.e. with total re-ignition both in the positive and the negative periods, and the dotted line in FIG. 5 shows the chronological sequence of the welding voltage when no re-ignition occurs in the positive period, and the changeover of the welding voltage takes place in accordance with the logical function diagram in FIG. 4 or the control circuit 20 in FIG. 3.

We claim:

1. A method of stabilizing a welding arc formed between a welding electrode and a workpiece during TIG welding with an alternating current, the method employing a welding voltage, which alternates between multiple positive and negative periods, thus generating a welding current, comprising:
    a) monitoring the positive period of the welding voltage;
    b) sensing if the welding arc has been reignited during the positive period;
    c) immediately shortening the time length of the positive period if the welding arc has not been reignited during the positive period, and immediately changing the polarity of the welding voltage to the negative period; and
    d) holding the length of the negative period substantially constant when the positive period is shortened.

2. The method of claim 1, wherein the frequency of the welding current is held substantially constant when the positive period is shortened.

3. The method of claim 2, additionally comprising correcting the intensity of the welding current such that the power which is supplied to the workpiece is held substantially constant when the welding arc is not reignited in the positive period.

4. TIG welding apparatus comprising:
    a) means for producing a welding arc;
    b) means for supplying a welding voltage with positive and negative periods to the welding arc producing means;.
    c) an invertor for inverting the period of the and
    d) an electronic control circuit including means for monitoring the positive period and sensing whether or not the welding arc is lit, and means for controlling the invertor so that the length of the positive period is shortened if the welding arc is not reignited in the positive period.

5. The welding apparatus of claim 4, wherein the electronic control circuit additionally comprises an oscillator and means for the regulation of the oscillator frequency, and means for the regulation of the balance between the time for which the welding voltage is positive and negative.

6. The welding apparatus of claim 5, wherein the electronic control circuit additionally comprises a logical circuit with means for sending control signals directly to the invertor when the control circuit has ascertained that the welding arc has been reignited in the positive period.

* * * * *

UNITED STATES PATENT AND TRADEMARK OFFICE
CERTIFICATE OF CORRECTION

PATENT NO. : 5,365,035

DATED : November 15, 1994

INVENTOR(S) : Knud J. Poulsen, et al.

It is certified that error appears in the above-identified patent and that said Letters Patent is hereby corrected as shown below:

In column 2, line 56, after "Disclosed" insert --are--.

In column 6, line 29 (claim 4), before "and", insert --welding voltage;--.

Signed and Sealed this

Tenth Day of October, 1995

Attest:

BRUCE LEHMAN

Attesting Officer

Commissioner of Patents and Trademarks